US008981270B2

(12) United States Patent
Tang et al.

(10) Patent No.: US 8,981,270 B2
(45) Date of Patent: Mar. 17, 2015

(54) METHOD FOR RECORDING TEMPERATURE PROFILES IN FOOD PACKAGES DURING MICROWAVE HEATING USING A METALLIC DATA LOGGER

(75) Inventors: Juming Tang, Pullman, WA (US); Fang Liu, Pullman, WA (US)

(73) Assignee: Washington State University, Pullman, WA (US)

( * ) Notice: Subject to any disclaimer, the term of this patent is extended or adjusted under 35 U.S.C. 154(b) by 1030 days.

(21) Appl. No.: 13/053,432

(22) Filed: Mar. 22, 2011

(65) Prior Publication Data

US 2012/0241443 A1 Sep. 27, 2012

(51) Int. Cl.
*H05B 6/64* (2006.01)
*H05B 6/68* (2006.01)
*A01K 43/00* (2006.01)

(52) U.S. Cl.
CPC .................................... *H05B 6/6441* (2013.01)
USPC ............................ 219/679; 219/710; 426/233

(58) Field of Classification Search
CPC ...................................................... H05B 6/6441
USPC ......... 219/679, 720, 702, 756, 710, 708, 707, 219/705; 426/233, 234, 243; 340/309.16, 340/309.7, 539.19, 584; 374/158, 209, 208, 374/179, 150
See application file for complete search history.

(56) References Cited

U.S. PATENT DOCUMENTS 4,230,731 A * 10/1980 Tyler ............................. 426/233
5,161,889 A * 11/1992 Smith et al. ..................... 374/29
5,422,465 A * 6/1995 Kim et al. ..................... 219/710
7,119,313 B2 10/2006 Tang et al.
2003/0179809 A1* 9/2003 Nakagawa et al. ........... 374/158
2005/0092319 A1* 5/2005 Payen et al. .............. 126/263.09
2009/0283517 A1* 11/2009 Mackay et al. ............... 219/700

OTHER PUBLICATIONS

Z. Tang et al; "Microwave Sterilization of Slice Beef in Gravy in 7-Oz Trays"; Journal of Food Engineering, vol. 89, Issue 4, Dec. 2008, pp. 375-383.

R.B. Pandit et al.; "Development of a Novel Approach to Determine Heating Pattern Using Computer Vision and Chemical Marker (M-2) Yield"; Journal of Food Engineering, vol. 78, Issue 2, Jan. 2007, pp. 522-528.

R.B. Pandit et al.; "Kinetics of Chemical Marker M-2 Formation in Mashed Potato—a Tool to Locate Cold Spots Under Microwave Sterilization"; Journal of Food Engineering, vol. 76, 2006, pp. 353-361.

M.H. Lau et al.; "Kinetics of Chemical Marker Formation in Whey Protein Gels for Studying Microwave Sterilization" Journal of Food Engineering, vol. 60, 2003, pp. 397-405.

Y. Wang et al.; "Using Whey Protein Gel as a Model Food to Study Dielectric Heating Properties of Salmon (*Oncorhynchus gorbuscha*) Fillets"; LWT—Food Science and Technology, vol. 42, 2009, pp. 1174-1178.

J. Tang et al.; "Microwave Sterilization/Pasteurization of Foods—Termal Process Technology of the Future: a Visit to TOP's Foods in Belgium"; Microwave Heating News, vol. 2(3), 2000 and printed with permission from TOP's Foods.

* cited by examiner

*Primary Examiner* — Quang Van

(74) *Attorney, Agent, or Firm* — Whitham, Curtis, Christofferson & Cook, P.C.

(57) ABSTRACT

The time/temperature history of a food tray or pouch heated by microwave energy applied through a waveguide can be accurately assessed on positioning and stabilizing a shielded data logger in an orientation where the base of the data logger is located generally close to zero depth (near the side wall) and the tip projects to the cold spot in the tray or pouch. A frame can be used to assure stability of orientation in a pouch while bracing can be used to assure stability in a tray. The properly configured food tray or pouch can serve as an accurate witness device for food items being processed in a similar manner under microwave heating for, e.g., sterilization or pasteurization.

7 Claims, 9 Drawing Sheets microwave cavity and 8-oz pouch with or without probe

Fig. 3 microwave cavity and 8-oz pouch with or without probe
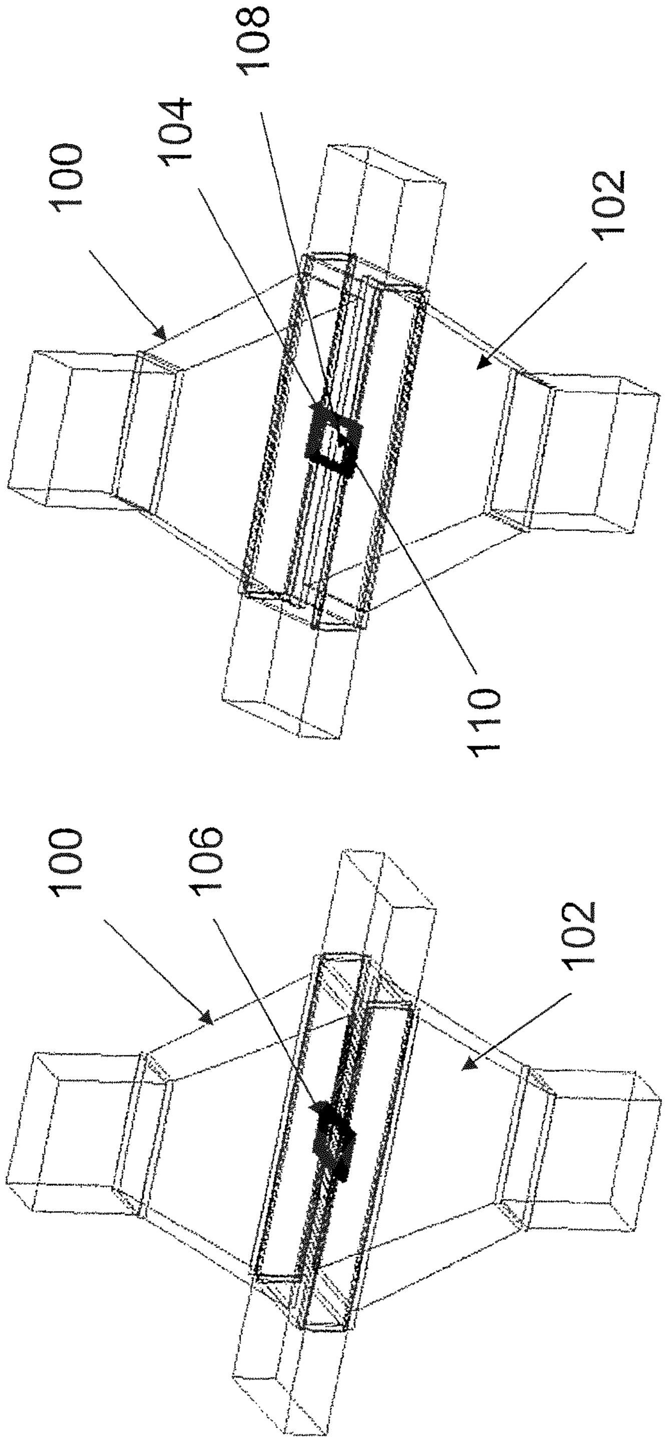

Fig. 4 E field with 8-oz pouch
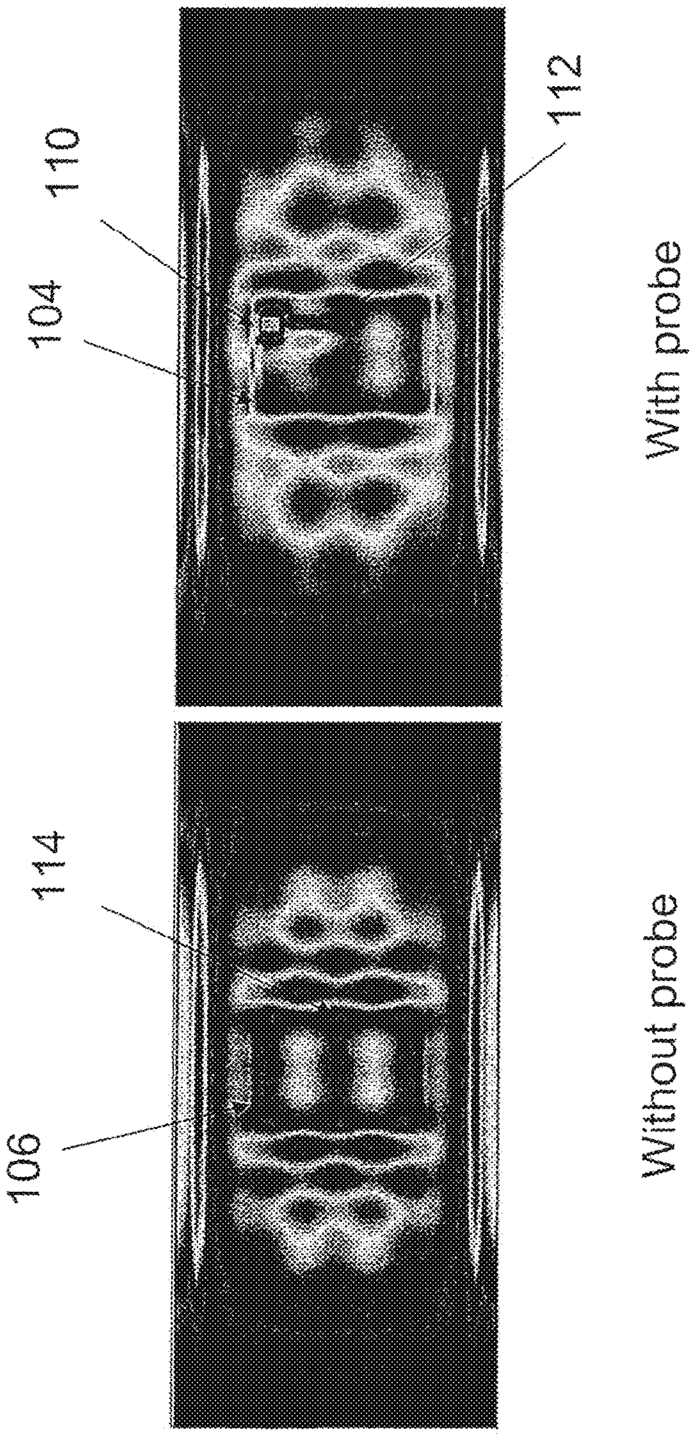

Fig. 4a Heating pattern in 8-oz pouch
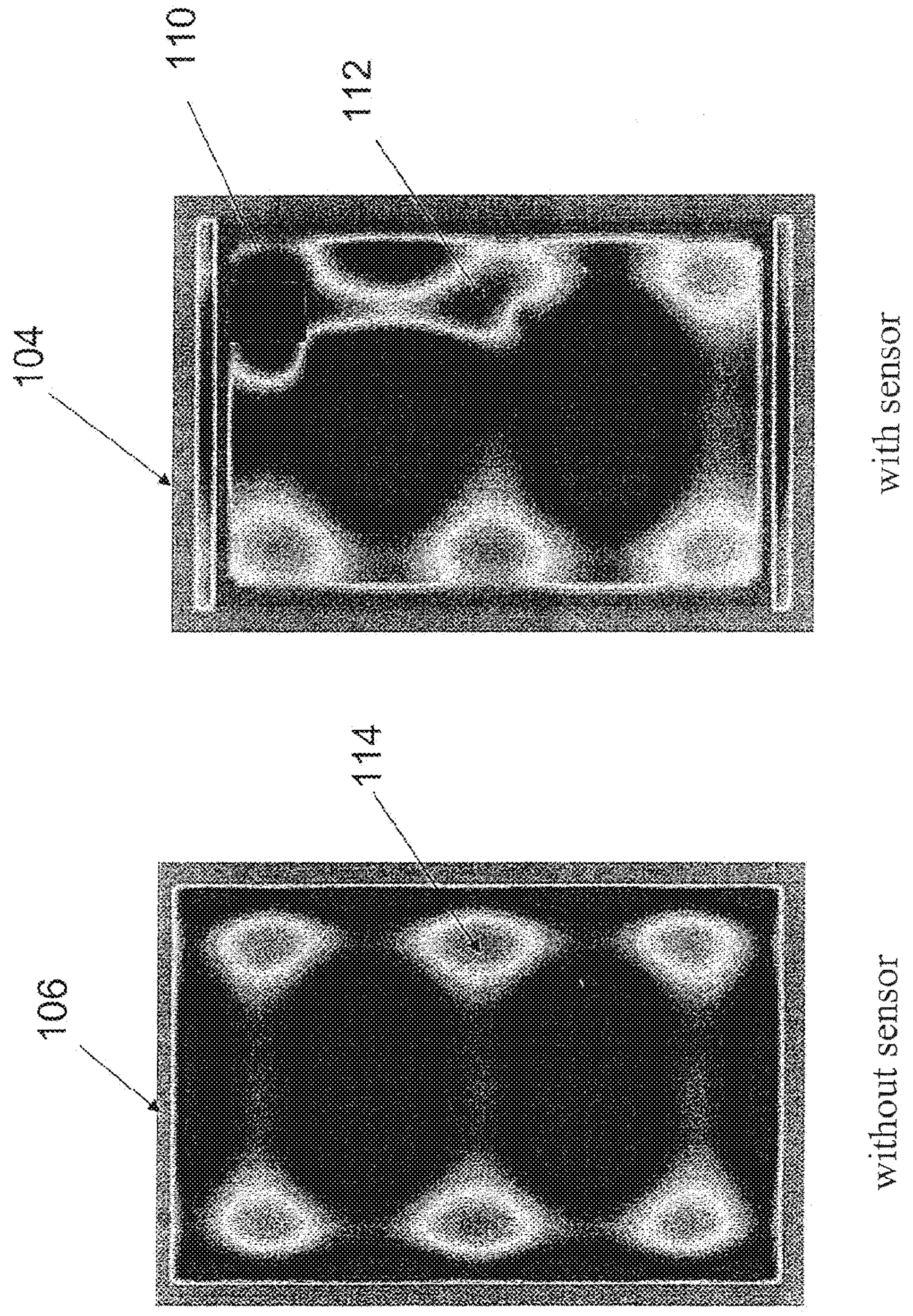

With data logger

Without data logger

METHOD FOR RECORDING TEMPERATURE PROFILES IN FOOD PACKAGES DURING MICROWAVE HEATING USING A METALLIC DATA LOGGER

This invention was made with government support under contract no. W911QY-07-C-0080 awarded by the U.S. Army Natick Soldier Center. The government has certain rights in the invention.

FIELD OF THE INVENTION

The invention is directed to pasteurizing and/or sterilizing foodstuffs using microwave energy and, more particularly, to using a data logger to provide a temperature profile for the foodstuffs during pasteurizing and/or sterilizing.

BACKGROUND

Microwave sterilization of pre-packaged foodstuffs has been researched for a number of years. See, for example, U.S. Pat. Nos. 4,962,298 and 5,074,200 which are directed to a microwave system for sterilization of pre-packaged food articles; U.S. Pat. No. 4,974,503 which describes and apparatus for irradiating food products to pasteurize, sterilize or uniformly heat food products; U.S. Pat. No. 4,952,763 which describes a system for sterilizing food packages with microwaves under pressure; U.S. Pat. No. 5,750,966 which describes a plant for pasteurizing or sterilizing food products using microwaves in a pressurized chamber; and U.S. Pat. No. 7,119,313 which describes a processing line for pasteurizing and/or sterilizing foodstuffs with microwaves. Microwave sterilization and pasteurization of foods is being commercially used in Europe by TOP's Foods (Tang, *Microwave Heating News* Vol. 2(3), 2000) where temperature monitoring of the food is measured indirectly by infrared temperature sensors and displacement sensors which monitor bulging of the tray tops. Despite the commercial success of microwave sterilization in Europe, the process has not been widely adopted in the U.S.

It would be advantageous in a large scale microwave based food sterilization or pasteurization system to provide a mechanism for assuring proper sterilization or pasteurization for different batches of product and for allowing identification of areas within the processing line which require repair or adjustment.

SUMMARY

According to the invention, a data logger is positioned within a food product package (tray or pouch) and includes a member positioned for sensing the temperature at the cold spot of the package. The data logger records temperature, and possibly other parameters of interest, against time, so that, for example, an accurate representation of the temperature reached at the cold spot during processing and the time period that the cold spot of the food product was maintained at a specific temperature can be discerned. Information pertinent to a temperature and time period required for pasteurization or sterilization of the food product can be derived from the data logger. This information can be provided during microwave processing or after processing of the food product, and may be provided by wired or wireless transmission (wireless transmission possibly providing greater flexibility for when and how the information is provided). The invention provides exemplary arrangements for positioning the data logger within a tray or pouch such that they do not interfere with microwave transmissions from a wave guide used for pasteurizing or sterilizing the food. That is, the configurations are selected such that the logger and thermal sensor do not alter the position of the cold spot in the food article or otherwise alter the heating provided by the microwaves to the food article. In addition, the data logger does not alter or otherwise corrupt the information detected within the food article during pasteurization or sterilization.

DESCRIPTION OF THE DRAWINGS

FIG. 3 is a schematic model showing the orientation of a probe for a data logger/thermal sensor within a food tray or pouch as it passes between opposing wave guides, and a showing control tray or pouch or food product tray or pouch not equipped with a data logger/thermal sensor positioned adjacent to the food tray or pouch with the data logger/thermal sensor;

FIG. 4 shows an E-field simulation for a data logger with a holder (e.g., tray or pouch) in a wave guide as shown in FIG. 3;

FIG. 4*a* shows a heating pattern simulation for a data logger with a holder (e.g., a tray or pouch) in a wave guide as shown in FIG. 3;

DESCRIPTION

The invention is directed to the use of a data logger, such as a metallic wireless data logger, in a processing line for microwave pasteurizing and/or sterilizing foodstuffs. The invention can be practiced in a variety of different microwave based processing lines, including without limitation the processing system described in U.S. Pat. No. 7,119,313 to Tang et al., which is herein incorporated by reference. Pasteurization involves heating foodstuffs to a temperature, typically between 80 ° C. to 100° C., sufficient to kill certain pathogenic bacteria and microorganisms. In sterilization, foodstuffs are heated to a higher temperature, typically between 100° C. to 140° C., to ensure elimination of more resistant microorganisms. Sterilization allows normally perishable foodstuffs to be stored at room temperature for extended periods of time, referred to as "shelf-stable" foods.

In the practice of the present invention, microwaves within the 915 MHz ISM band or lower are preferred. Advantageously, microwaves within this frequency band have a longer wavelength and therefore can penetrate deeper into the foodstuff to be heated than can higher frequency microwaves (e.g., microwaves in the 2450 MHz ISM band). Microwave systems that uses 2450 MHz magnetrons and lower power levels typically take about thirty minutes to heat a food product whereas using longer wavelengths and higher power permits heating of the food product for 3-5 minutes.

Suitable microwave pasteurization or sterilization lines may include a pre-heating section, a microwave-heating section, a holding section, a cooling section, and an unloading section. In particular embodiments, the pre-heating section, the microwave-heating section, the holding section, and the cooling section comprise respective chambers for heating or cooling foodstuffs therein. The pre-heating section may be used to pre-heat the foodstuff using conventional heating. The microwave-heating section heats the foodstuff for a predetermined time period using microwave heating. The microwave-heating section includes at least one microwave cavity that is operable as a single-mode cavity when microwaves are directed into the cavity for heating the foodstuff. Preferably, the microwave-heating section includes a plurality of cavities spaced along a processing line and through which the food articles are conveyed by a conveyor belt. In the holding section, the foodstuff may be heated to substantially maintain the pasteurization or sterilization temperature of the foodstuff until the foodstuff is pasteurized or sterilized. In the cooling section, the foodstuff may be cooled to a reduced temperature (e.g., about room temperature) for further handling or processing.

Figure 1:
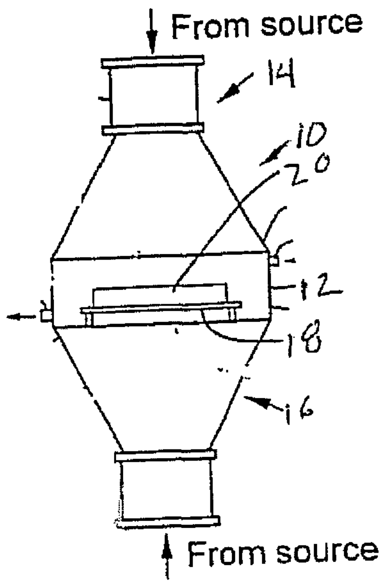
FIG. 1 is a schematic diagram of an exemplary microwave heating apparatus.

FIG. 1 is an exemplary microwave-heating apparatus 10 which may be used in the practice of the invention, and is illustrated according to one embodiment of U.S. Pat. No. 7,119,313. The microwave-heating apparatus 10 includes a microwave cavity 12, a first waveguide 14 for directing microwaves from a microwave source (not shown) to the cavity 12, and a second waveguide 16 for directing microwaves from a microwave source (not shown) to the cavity 12. In other embodiments, the microwave apparatus can have only one of the waveguides 14, 16 so that microwaves are directed into the cavity from only one direction. In addition, the waveguides 14, 16 can be in an alignment or can be offset from one another along a processing line or conveyor belt. Positioned in the cavity 12 may be a support stand 18 for supporting a foodstuff 20 to be irradiated by microwaves introduced into the cavity by the waveguides 14, 16. The support stand 18, if present in the processing system, desirably is open at the bottom to allow irradiation of the top and bottom of the foodstuff 20 and to allow a fluid medium in the cavity 12 to contact substantially the entire surface of the foodstuff 20.

Figure 2:
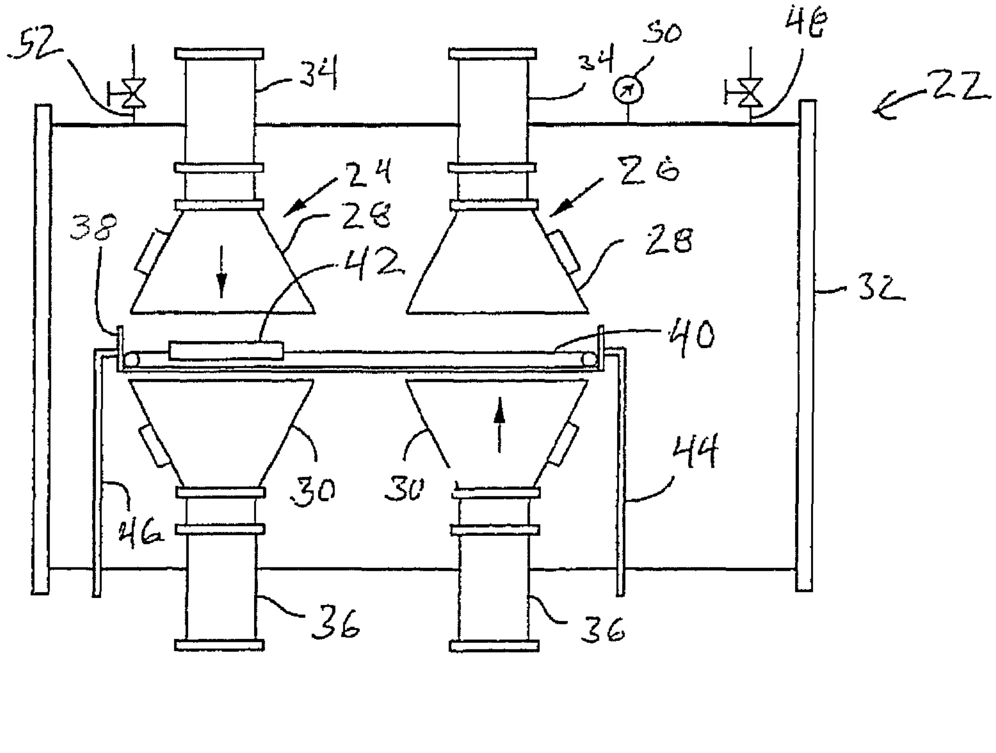
FIG. 2 is a schematic diagram of an exemplary microwave heating apparatus.

In the embodiment shown in FIG. 2, a microwave-heating apparatus 22 as illustrated and discussed in U.S. Pat. No. 7,119,313 includes a first microwave unit 24 and a second microwave unit 26, each of which include a pair of opposed waveguide applicators 28, 30. Each microwave unit 24, 26 has a microwave "cavity" defined as the respective space between each pair of microwave applicators 28, 30. A pressure vessel 32 forms an enclosure around the waveguide applicators 28, 30. The waveguide applicators 28, 30 are coupled to a microwave source (not shown) via the waveguides 34, 36, respectively, that extend through the walls of the pressure vessel 32. A container 38 extends between the waveguide applicators 28, 30 of the first and second microwave units 24, 26. A conveyor 40 can be positioned in the container 38 to move a foodstuff 42 between the microwave cavities defined between the microwave applicators 28, 30 during microwave heating. A fluid medium (e.g., water) can be introduced into the container 38 through an inlet-fluid conduit 44 to improve heating uniformity during microwave heating. The fluid medium can be discharged through an outlet-fluid conduit 46. The foodstuff 42 can be heated while immersed in a flow of the fluid medium or in a non-flowing pool of the fluid medium. The illustrated pressure vessel 32 has a gas inlet 48 fluidly connectable to a source of a pressurized gas (e.g., compressed air) (not shown) for establishing a pressurized atmosphere (pressure indicated by a gauge 50) inside the pressure vessel 32. The container 38 may be open to the atmosphere inside the pressure vessel 32 to prevent bursting of the packaging containing the foodstuff 42. After the foodstuff 42 is heated in the microwave apparatus 22, the pressurized gas can be released from the pressure vessel 32 through a gas outlet 52.

This invention is directed to properly using a data logger in a package of food that will be heated by microwave energy provided by a waveguide in a microwave based sterilization or pasteurization system. The package may be in the form of a tray or pouch. In the practice of the invention, the data logger can be inserted in an actual food product or a model food (e.g., a whey gel with dielectric properties adjusted to be similar to the actual food product) which has the same attributes of the actual food product which is to be pasteurized or sterilized by exposure to microwaves (for example, according to a process as described above similar to that described in U.S. Pat. No. 7,119,313 or by other procedures).

The data logger will be used to measure time/temperature profiles during microwave heating. For example, the data logger will preferably be connected to a thermal sensor which is positioned at the cold spot of a food article (i.e., the coldest spot within the tray or pouch containing the food article), and will detect the temperature at the cold spot for a period of time. Depending on the food article (e.g., peas, carrots, potatoes, fish, meat, soup, gravy, or any other food item to be pasteurized or sterilized), the temperature will need to be maintained at a threshold value for a specified period of time to achieve pasteurization or sterilization. A food provider can use the logged time/temperature profile at the cold spot to assure that the food products have been properly pasteurized or sterilized. If the cold spot does not increase under the influence of the microwave heating to the threshold temperature and is not maintained at the threshold temperature for the specified of time, the food product can be determined to not be correctly pasteurized or sterilized.

A variety of data loggers and thermal sensor probes can be used in the practice of this invention. For example, suitable loggers and temperature sensors can be obtained from Elektrolaboratoriet A/S of Denmark and Arvada, Colo. under the trade name "ELLAB" (miniloggers being preferred); MESA Laboratories of Lakewood, Colo. (the "DataTrace" product line are self-contained, wireless, high precision loggers used in critical manufacturing, quality control, and transportation applications); OsPens of Quebec, Canada manufactures fiber optic temperature sensors; and FISO Technologies of Quebec, Canada which manufacturers fiber optic sensors. In the practice of this invention, information pertinent to a temperature and time period required for pasteurization or sterilization of the food product can be derived from the data logger. This information can be provided during microwave processing or after processing of the food product, and may be provided by wired or wireless transmission (wireless transmission possibly providing greater flexibility for when and how the information is provided, e.g., a requirement of connecting a data logger to an external signal conditioning and data acquisition system makes such loggers less desirable for continuous industrial processes such as sterilization of large batches of food products). It is preferable to use a data logger which can be used in high microwave power fields to permit heating of food products in shorter periods of time. Further, it is advantageous to use temperature sensors which are less expensive and fragile.

Detecting the temperature of the cold spot in food packages and the ability to determine whether a product has received sufficient heating for a desired purpose (e.g., sterilization of pasteurization) is well understood in the art. Determination of the cold spot can be performed by automated or other means well known in the trade. As background, the following articles, which are herein incorporated by reference, discuss identification and use of a cold spot in food product packaging: (1) Wang et al., "Using whey protein gel as a model food to study dielectric heating properties of salmon (*Oncorhynchus gorbuscha*) fillets", *LWT-Food Science and Technology* 42:1174-1178 (2009); (2) Tang et al., "Microwave Sterilization of Sliced Beef and Gravy in 7 oz Trays", *J. Food Engineering* Apr. 25, 2008; (3) Pandit et al. "Development of a Novel Approach to Determine Heating Pattern Using Computer Vision and Chemical Marker (M-2) Yield", *J. Food Engineering* 78 (2):522-528 (2007); (4) Pandit et al. "A Computer Vision Method to Locate Cold Spots in Foods in Microwave Sterilization Processes" *Pattern Recognition* 40(12): 3667-3676 (2007); (5) Pandit et al. "Kinetics of Chemical Marker M-2 Formation in Mashed Potato-A Tool to Locate Cold Spots Under Microwave Sterilization" *J. Food Engineering* 76(3):353-361 (2006); and (6) Lau et al., "Kinetics of Chemical Marker Formation in Whey Protein Gels for Studying High Temperature Short Time Microwave Sterilization" *J. Food Engineering* 60:387-405 (2003).

One problem with using a data logger in a food product (e.g., pouch or tray) in connection with microwave heating is that the presence of the data logger itself can impact the heating imparted by the microwave sources and the measurements which are made. Specifically, metal surfaces on the data logger assembly need to be shielded. Further, the data logger needs to be oriented within the tray or pouch in a manner which does not adversely impact the microwave heating imparted to the food product or affect the location'of the cold spot. In addition, the data logger needs to be securely positioned within the food product so that changes in position do not adversely impact the microwave heating imparted by the microwave system or change the location of temperature measurement. The invention provides exemplary arrangements for positioning a data logger within a tray or pouch such that they do not interfere with microwave transmissions used for pasteurizing or sterilizing the food (e.g., they do not alter the position of the cold spot in the food article or otherwise alter the heating provided by the microwaves to the food article), and so that the data logger does not alter or otherwise corrupt the information detected within the food article during pasteurization or sterilization (e.g., the thermal sensor remains positioned in the cold spot during microwave heating and the orientation of the sensor and data logger does not change within the tray or pouch).

FIG. 3 shows an isometric representation of an enclosed cavity or continuous processing tunnel used in microwave heating, pasteurization or sterilization processes, such as those described for example in U.S. Pat. No. 7,119,313. In particular, a pair of opposing wave guides 100 and 102 will have trays or pouches 104 and 106 pass between them during operation of a microwave sterilization system. As discussed above, the space between the wave guides 100 and 102 can be pressurized and/or adapted to allow the ingress and egress of fluids for heating and/or maintaining the temperature of the heated food products. Tray or pouch 104 is shown with a probe 108 positioned therein so as to project from a point of approximately zero depth near a side wall of wave guides 100 and 102 towards a depth in the center region of the wave guides 100 and 102. The end of the probe 110 is positioned in the cold spot of the food article in the tray or pouch 104. Tray or pouch 106 lacks the probe 110.

For experimentation leading to the discovery that the shielding and orientation of the probe matters and must be stable to provide relevant time/temperature profiles for microwave sterilization or pasteurization of a food product, the tray or pouch 106 served as a control. During actual sterilization or pasteurization processes, only one or a few food product trays or pouches containing the food to be heated in a batch of food (or containing model food with properties adjusted to be similar to the batch of food to be heated) will need to be equipped with a data logger and temperature sensor. The data logger equipped food product trays or pouches 104 will be used for calibration periodically for the batch and will function essentially as a witness for the trays or pouches 106 of food that will be sterilized or pasteurized for storage, sale or consumption.

FIG. 4 shows an electronic field (E-field) simulation for a metal thermocouple probe 110 oriented as shown in FIG. 3. As can be seen from the simulation, the metal thermal couple probe 110 projects to the cold spot 112 in pouch 104 and does not affect the position of the cold spot 112 (compare cold spot 114 in pouch 106 which lacks the probe 110), or alter the distribution of energy near the zero depth region adjacent a side wall of the wave guides. From FIG. 4, it can be seen that locating the wireless data logger nearest the zero depth region minimizes the effect of the metallic body on the electrical field pattern heating in microwave applicators. If the thermocouple probe 110 was oriented differently, e.g., at an angle, sideways at the depth of the cold spot, etc., the wireless data logger would adversely impact the electric field pattern and would thus make the use of the data logger less reliable for assuring proper heating, pasteurization or sterilization.

Similar to FIG. 4 for the electrical field simulation, FIG. **4*a* shows the heating pattern simulation for a metal thermocouple probe 110 oriented in FIG. 3. As can be seen from the simulation, the metal thermal couple probe 110 projects to the cold spot 112 in pouch 104 and does not affect the position of cold spot 112 (compare cold spot 114 in pouch 116 which lacks the probe 110**).

Figure 5:
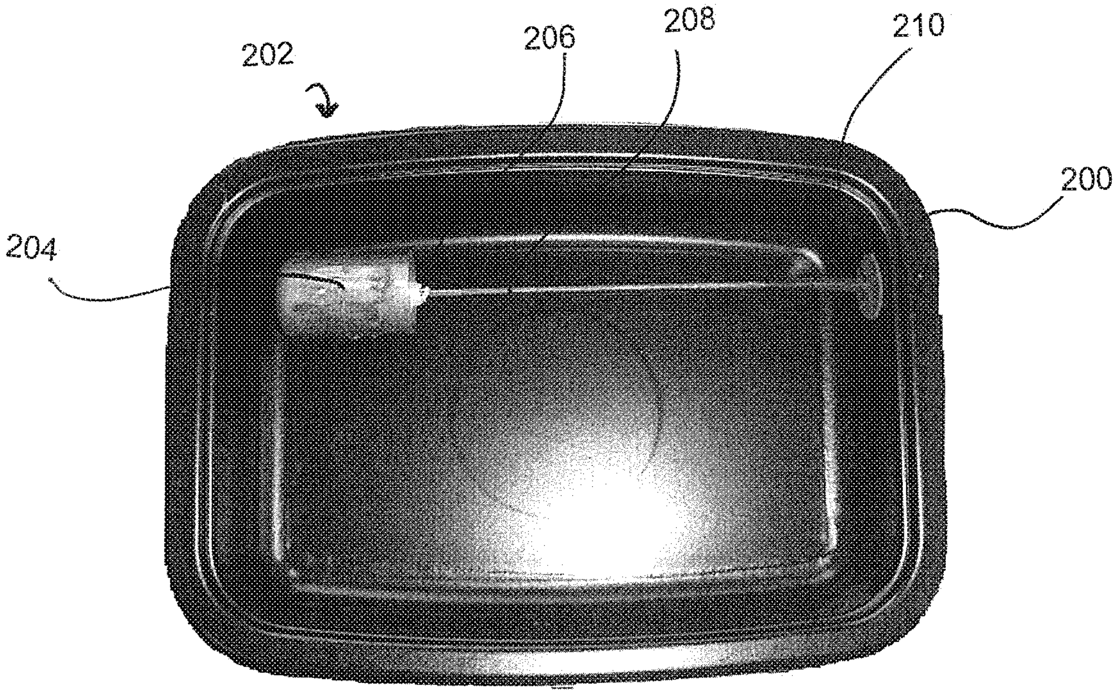
FIG. 5 shows plastic shielding positioned on a metal base of a data logger in a food tray, as well as a bracing member to hold the thermal sensor in a desired position, e.g., the cold spot.

FIG. 5 shows a 10 oz. plastic tray 200 in which a metallic data logger 202, such as those sold by Ellab, is positioned. The base 204 of the metallic data logger 202 is shrouded with a plastic material to prevent an adverse impact on the microwave energy which will be imparted to the food article. The probe 206 may have a length of 10-80 mm. To assure that the tip 208 of the probe 206 remains in a desired location, such as the cold spot of the food product (the tip 208 being equipped with a temperature sensor for measuring the temperature of the food product), a brace member 210 is provided to brace the data logger on one side of the tray 200, with the base 204 bracing the data logger on the other side of the tray 200. As shown in FIGS. 3, 4 and **4*a*, the tray 200 will pass through the wave guides with the base 204 close to zero depth; therefore, the positioning of the base 204 and the shrouding of the base 204 in plastic (e.g., Ultem or other suitable material) will prevent this portion of the data logger 202 from adversely impacting the microwave energy distribution within the tray 200. In addition, bracing the data logger 202 into position will prevent it from moving around within the tray 200 during processing. In these ways, the temperature profile logged by the data logger 202** provides an accurate representation of the temperature reached in the cold spot for a period of time. Thus, the food processor can accurately determine that the food is being properly exposed at appropriate microwave powers and for appropriate durations to achieve a selected heating result, e.g., sterilization or pasteurization.

Figure 6A:
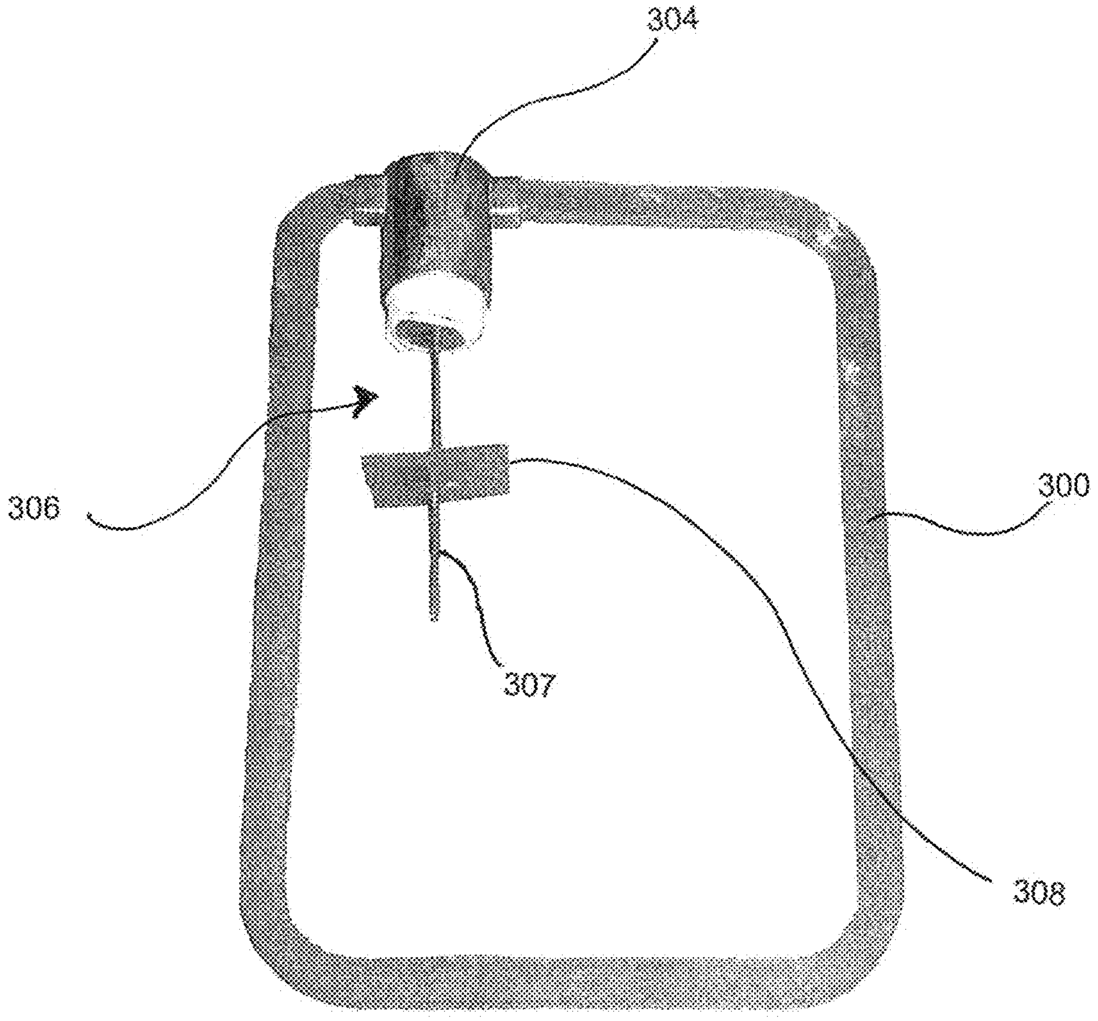
FIGS. 6*a* and 6*b* show a plastic data logger holder and sensor used in conjunction with a food pouch.
Figure 6B:
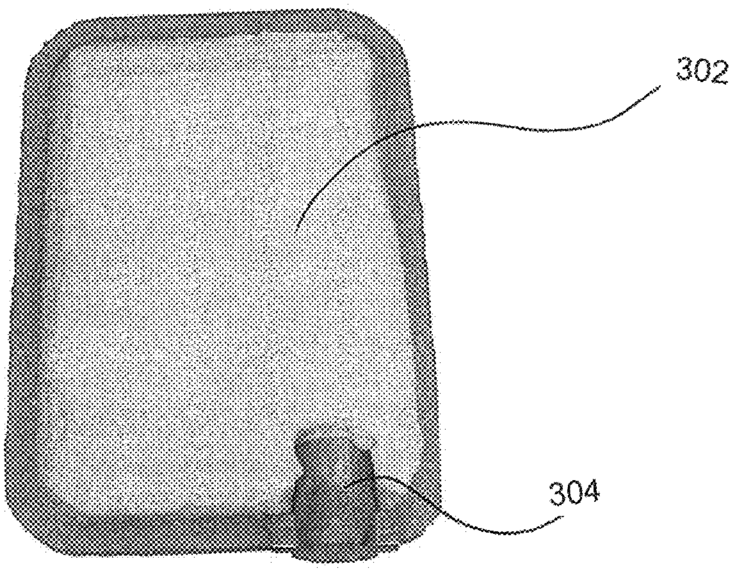

FIGS. 6*a-b* show a plastic frame 300 (made, for example, of Ultem, or other suitable material) which, for exemplary purposes, encircles a food pouch 302. The base 304 of a data logger 306 is affixed to the frame 300 in order to hold the data logger 306 in position within food pouch 302. The purpose of the frame 300 is to stability hold the data logger 306 in position while in the pouch and during use. While the frame 300 may encircle the pouch, the frame 300 may only partially encircle the pouch or may only be positioned at one end, provided that the data logger is held in its configuration of projecting straight into the pouch during handling and use. For further stability, a wing member 308 preferably made from a silicone rubber can be positioned on the probe 307. The wing member 308 serves to hold the probe 307 generally centrally between the top and bottom of the pouch 302 (i.e., the wing member 308 holds the probe above and below a top and bottom surface inside of said pouch), and to prevent rolling of the probe from its desired location (e.g., at the cold spot of the food product). A variety of mechanisms can be employed to secure the data logger 306 to the plastic frame 300. FIG. 6*b* shows the base of the data logger 306 positioned on the frame 300 with a portion that includes a probe with a thermal sensor projecting into the pouch 302 to the cold spot. Once the food product (or a model food) is positioned within the food pouch 302, the food can be heated by microwave energy, and a time/temperature profile can be obtained from the data logger 306 to assure a selected heating result such as, for example, sterilization or pasteurization of the food product.

Figure 7:
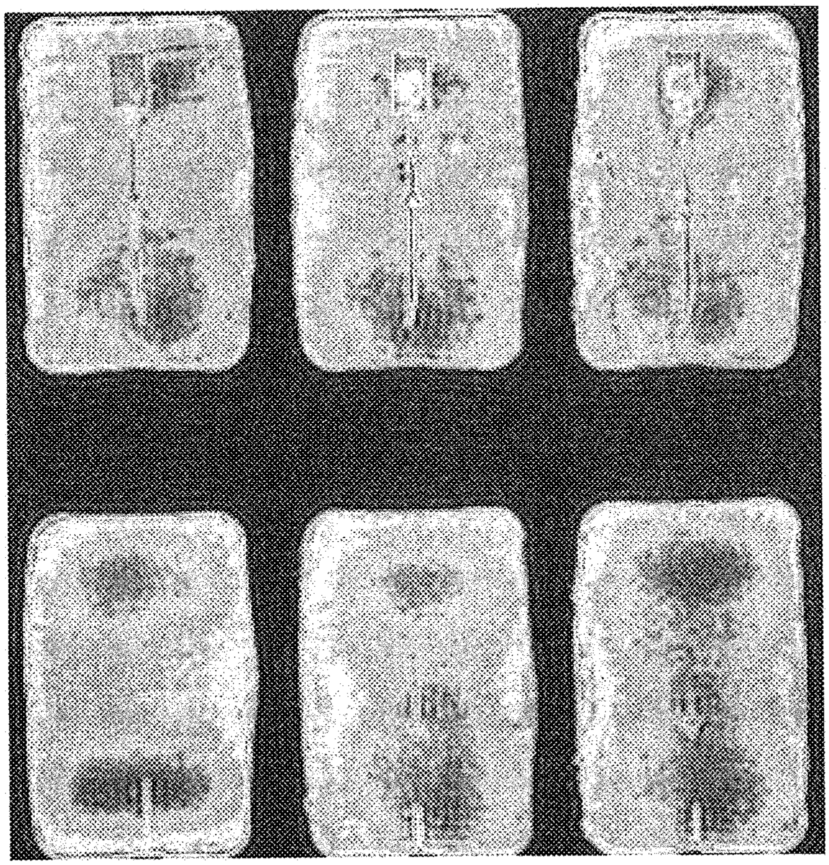
FIG. 7 shows the heating pattern as indicated by chemical marker-M2 in whey protein gels in 10 oz trays with and without a metal data logger where the data logger is oriented according to the invention.

FIG. 7 shows a heating pattern as indicated by chemical marker-M2 for whey protein gels in 10 oz trays with (top gels) and without (bottom gels) a metal data logger. The heating pattern was obtained using well known procedures such as those described in the articles referenced above. What the results show is that when the data logger is shielded, and positioned with its base towards the zero depth position and its tip projecting outward towards the cold spot, the presence of the data logger does not have any adverse impact on the microwave heating of the food product. Thus, the data logger, when shielded, and securely positioned appropriately within the food product, can provide accurate measurements of the time/temperature history for the food product under microwave heating.

If the data logger is metal and is unshielded, its presence reflects microwaves and changes the heating which can be achieved within a food tray or pouch, and accurate time/temperature profiles at the cold spot cannot be determined. Similarly, if the data logger is not oriented within the food tray or pouch as described above, the heating pattern will be altered by the data logger and the location of the cold spot may be changed. Furthermore, if the data logger is not stabilized in position in the food tray or pouch, the data logger may move around inside the tray or pouch through simple handling of the tray or pouch, and thus not be able to provide accurate time/temperature profiles which will be required to assure adequate heating for, e.g., sterilization or pasteurization.

Figure 8:
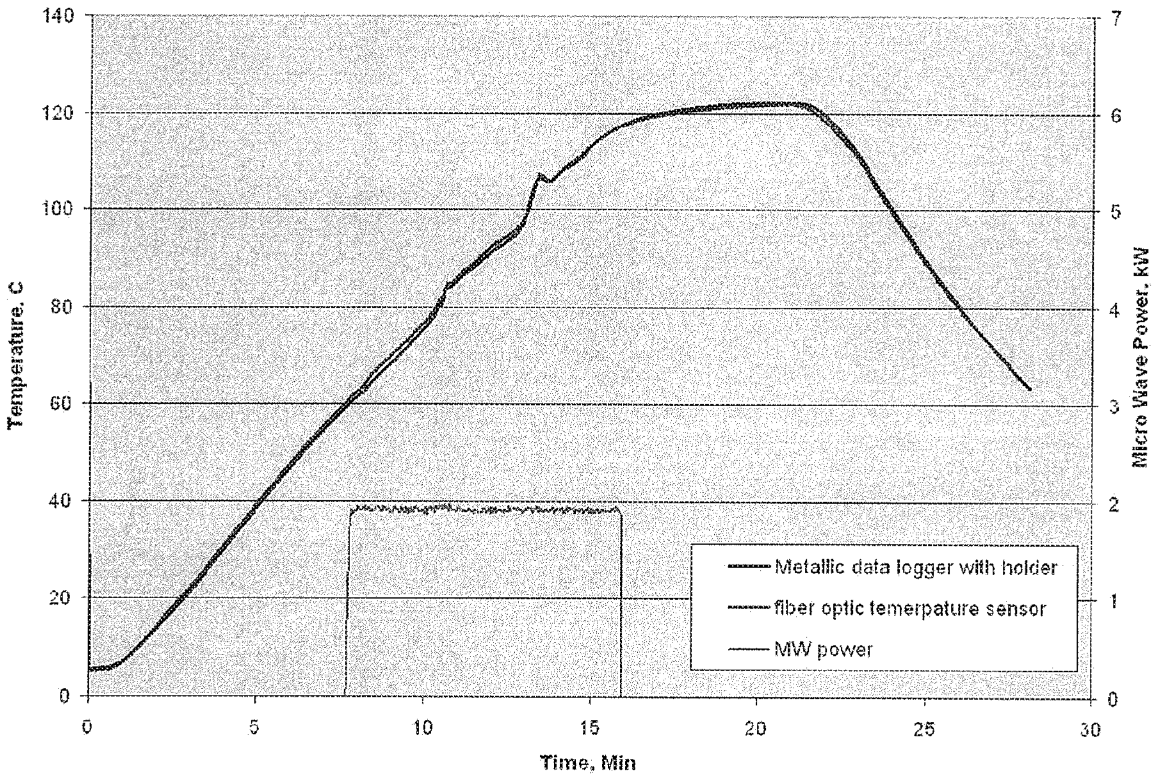
FIG. 8 shows a graph of a temperature profile measured with a wireless data logger with a holder in 10 oz mashed potato trays during a microwave sterilization process with comparative results using a fiber optic sensor.

FIG. 8 shows a graph of a temperature profile obtained with an Ellab wireless data logger in 10 oz mashed potato trays during a microwave sterilization process. Temperature and microwave power are plotted against time. FIG. 8 shows that the temperature profile matches temperature measurements made with fiber optic sensors. While the temperature profile in FIG. 8 is a graph, it will be understood that the same information can be provided in a table, or in other forms (e.g., a simple data stream with temperature and time information). The time and temperature profile basically is a representation of data points logged by said data logger which indicate the temperature of the food (or model food) at a point in time after exposure to microwave energy. The time and temperature profile can be used by a food processor to control, e.g., heating, sterilization or pasteurization, of food products in trays or pouches that are similar to those which contain a data logger. For example, if a microwave system such as that described in U.S. Pat. No. 7,119,313 were used for processing vegetables, meat, fish, or other food products of interest (or any other microwave system were employed), and a data logger, used as described herein provides a time and temperature profile showing that under selected conditions (e.g., microwave power, wavelength, time of exposure), sterilization or pasteurization can be achieved (e.g., the cold spot reaches a requisite temperature and is held at that temperature for a requisite time), then other food products subjected to those same processing conditions will achieve the same heating results (e.g., sterilization or pasteurization). Calibration of the system with a datalogger containing tray or pouch of food can be performed at preset intervals (or ad hoc) to assure that the system is continuing to provide the desired microwave heating to the food products.

In short, FIGS. 4-8 demonstrate that heating patterns in a food package are not affected by a holder and/or a metallic data logger under specified microwave power levels , e.g., 7.5 kW per cavity. Using the same design for a holder, virtually any kind of data logger can be used in the microwave field to measure temperature profiles in a food package during microwave pasteurization or sterilization processes. The wireless data logger is located in a position and in an orientation within the food article that minimizes the effect of the metallic body on the electric field pattern heating in a microwave applicator. In addition, the holder with a wireless data logger can be inserted into pouches or trays containing homogenous (e.g., a single food product such as mash potatoes) or heterogenous food products (e.g., a mixed food product such as beef and gravy (pouches or trays) to record temperature profiles during microwave heating processes.

The invention has been described in terms of its preferred embodiments. However, those of skill in the art will recognize that the invention can be practiced with considerable variation within the scope of the appended claims.

The invention claimed is:

1. A method of microwave heating of food products, comprising the steps of:

positioning a data logger in a position within or projecting in a food tray or pouch with a base of said data logger oriented adjacent one side of said food tray or pouch and a temperature sensor connected to said data logger projecting from said base of said data logger to a cold spot within said food tray or pouch;

securing said data logger in said position within or projecting in said food tray or pouch;

exposing said food tray or pouch to microwave energy with said one side of said tray or pouch oriented close to a sidewall of a microwave wave guide and said temperature sensor projecting a selected depth within said microwave wave guide from said sidewall; and determining a time and temperature profile for food or model food within said food tray or pouch from said data logger.

2. The method of claim 1 further comprising the step of using the time and temperature profile to control sterilization or pasteurization of food products stored in food trays or food pouches which do not contain said data logger.

3. The method of claim 1 wherein said positioning step is performed in a food pouch and said securing step includes the step of securing said base of said data logger to a plastic frame.

4. The method of claim 3 wherein said plastic frame encircles said food pouch.

5. The method of claim 4 wherein said positioning step includes the step of attaching to a probe connected to said temperature sensor a member which holds the probe above and below a top and bottom surface inside of said pouch.

6. The method of claim 1 wherein said positioning step is performed in a food tray and said positioning step includes bracing a probe connected to said temperature sensor against a wall of said tray and said base of said data logger against an opposing wall of said tray.

7. The method of claim 1 further comprising the step of shielding at least the base of said data logger with a plastic shroud.

* * * * *